United States Patent
Woodward et al.

[11] Patent Number: 5,963,879
[45] Date of Patent: Oct. 5, 1999

[54] BINNING OF THREE DIMENSIONAL SEISMIC DATA

[75] Inventors: Marta Woodward; Nick Moldoveanu, both of Houston, Tex.

[73] Assignee: Schlumberger Technology Corporation, Houston, Tex.

[21] Appl. No.: 08/979,591

[22] Filed: Nov. 26, 1997

[51] Int. Cl.$^6$ .................................................. G06F 19/00
[52] U.S. Cl. ............................................. 702/17; 367/56
[58] Field of Search .......................... 367/56, 57; 702/17, 702/18, 14, 16

[56] References Cited

U.S. PATENT DOCUMENTS

| | | | |
|---|---|---|---|
| 4,742,497 | 5/1988 | Beasley et al. | 367/52 |
| 4,797,861 | 1/1989 | Beasley | 367/50 |
| 5,430,689 | 7/1995 | Rigsby et al. | 367/56 |
| 5,487,052 | 1/1996 | Cordsen | 367/56 |
| 5,511,039 | 4/1996 | Flentge | 367/56 |
| 5,661,697 | 8/1997 | Swan et al. | 367/47 |
| 5,671,136 | 9/1997 | Willhoit, Jr. | 702/18 |
| 5,787,051 | 7/1998 | Goodway et al. | 367/56 |

*Primary Examiner*—Donald E. McElheny, Jr.
*Attorney, Agent, or Firm*—Rosenthal & Osha L.L.P.

[57] ABSTRACT

Three dimensional seismic survey data are acquired and processed using a hexagonal sampling grid. The seismic data are grouped into hexagonal bins defined by the hexagonal grid instead of into rectangular bins defined by a rectangular grid. Method and apparatus which bin the data, although described for square and regular hexagonal grids, are also applicable to rectangles and hexagons of any shape. Because hexagonal binning requires fewer gridpoints than rectangular binning, survey source or receiver interval may be increased, which may help reduce survey cost.

22 Claims, 6 Drawing Sheets

REGULAR HEXAGONAL GRID

BINNING OF THREE DIMENSIONAL SEISMIC DATA

BACKGROUND

The invention involves the acquisition and processing of three dimensional (3D) seismic data, and, in particular, the acquisition and processing of seismic data using a sampling grid.

Three dimensional seismic exploration of the earth's terrestrial and marine subsurface is used in the exploration, production, and development of hydrocarbons. In seismic exploration, underground geological structures are illuminated and imaged with sound energy. The basic components of a surface seismic exploration system would include a source (e.g., a dynamite explosion or airgun sounding) on the earth's surface and a receiver on the surface. The source generates sound waves to be reflected from a subsurface structure and the receiver receives and records the upwardly reflected sound energy. Data from the seismic experiment are recorded in the form of a seismic trace, i.e., a record of the reflected sound events received at the surface receiver over a period of time. The image of the subsurface is constructed by processing the reflected energy from many of these seismic traces.

In "prestack imaging," seismic traces from single source-receiver pairs are processed individually. In "poststack imaging," on the other hand, data from many single source-receiver pairs are combined by stacking (summing) before processing to increase the signal-to-noise ratio and to reduce the number of seismic traces that must be processed. The traces are first grouped into "common midpoint gathers" and then operations such as Normal Movement ("NMO") and Dip Moveout ("DMO") are performed. A midpoint is defined as the surface location halfway between a trace's source and receiver.

After NMO and DMO stacking, source and receiver locations are considered identical and equal to the midpoint location. However, because of obstructions, irregular topography, feathered cables at sea, etc., even the most careful planning for recording groups of traces generally does not result in traces which share exactly the same midpoint. To accommodate these midpoint variations, 3D seismic exploration uses a layout of sources and receivers in a regular geometric configuration. For example, a regular two-dimensional grid, traditionally rectangular or square, is superimposed on the earth's surface. The midpoints between each source and receiver pair are assigned to the nearest grid point and surrounding cell or bin. This process is termed "binning". With binning, a piece of data with an analog position (i.e., acquired at an analog position in a coordinate system) is assigned to the nearest point on a sampling raster or regular array (e.g., to a gridpoint or a grid cell center point) that can be processed by a digital computer. The size of the grid cell is determined by the spatial sampling criteria in such a way that the geological objectives of the survey are met. Bin size is determined by the source spacing and receiver spacing (interval between consecutive sources and consecutive receivers). There is an inverse relation between the bin size and the cost of the survey for acquisition and processing.

An example layout of sources (source stations) 124 and receivers (receiver stations) 108 in a regular geometric configuration is shown in FIG. 1A. Using such a configuration, three-dimensional acquisition systems for seismic exploration (cable surveys) on land, in transition zones (areas between land and deep water), and in the sea are similar. One or more receiver cable lines 102 and one or more source cable lines 112 are usually used to form the source and receiver layout. The source lines 112 may be perpendicular to the receiver lines 102, or they may be parallel to, or at a particular diagonal angle to, the receiver lines 102 (not shown).

FIG. 1B shows a regular grid 111 (e.g., a rectangular or square grid) superimposed on the regular geometric configuration of the sources 124 and receivers 108 of FIG. 1A. The regular grid 111 defines individual bins 114.

For example, the 3D acquisition geometry provided by the configuration of FIG. 1A is determined by the following setup or known parameters: receiver station 108 (-to-station 108 distance) interval, source station 124 (-to-station 124 distance) interval, receiver line 102 (-to-line 102 distance) interval, source line 112 (-to-line 112 distance) interval, and receiver spread (number of receiver lines 102 and receiver stations 108 active at any given time). These five parameters depend on: bin size, maximum offset (the maximum distance between a source and an active receiver), minimum offset, fold (how many samples are going to be put into a bin), offset distribution (e.g., mostly near or mostly far) and azimuth distribution (e.g., all sources and receivers are lined up along a north and south direction or for different angles through the bins).

The bin size of the bins 114 defined in FIG. 1B (referred to by the spacings, "$\Delta x_{bin}$", "$\Delta y_{bin}$") in both the perpendicular x and y directions is dictated by the spatial sampling requirements that are functions of the seismic resolution requested or needed to properly interpret the seismic data.

As shown in FIG. 1B, the receiver station 108 spacing interval, $\Delta r$, and the bin 114 spacing in the receiver line 102 (see FIG. 1A) direction, $\Delta x_{bin}$, may be related by: $\Delta x_{bin} = \Delta r/2$. The source station 124 interval, $\Delta s$, and the bin 114 size in the source line 112 (see FIG. 1A) direction, $\Delta y_{bin}$, may be related by: $\Delta y_{bin} = \Delta s/2$. With grid 111 and these relationships between $\Delta x_{bin}$ and $\Delta r$ and $\Delta y_{bin}$ and $\Delta s$, the locations of the midpoints between each source 124 and receiver 108 will be at the center of bins 114, for example, at bin center gridpoints 110 in FIG. 1B (not all bin center gridpoints 110 are shown in FIG. 1B).

SUMMARY

The invention features the use of a hexagonal sampling grid in binning seismic survey data. Advantages of a hexagonal sampling grid versus a rectangular sampling grid may include: reducing the number of samples required without jeopardizing the sampling requirements; reducing the number of seismic traces required to be processed; and providing more efficient and more accurate processing methods with data being binned in a hexagonal grid.

In general, in one aspect, the invention features a method of associating seismic data with hexagonal bins to aid in processing the seismic data. The method may include: mapping sample data onto a nonorthogonal coordinate grid on which different types of polygonal bins are constructed; determining into which type of polygonal bin the sample data are allotted; and associating the allotted hexagonal bin with a corresponding one of the other bins.

In general, in another aspect, the invention features an apparatus for binning sample data. The apparatus may include: a memory storing logic used for binning the sample data; and a processor which operates under control of the logic to: (1) map the sample data onto a nonorthogonal coordinate grid on which may be constructed different types of parallelogram bins and hexagonal bins, (2) determine into which type of parallelogram bin the sample data are allotted, and (3) associate the allotted parallelogram bin with a corresponding one of the hexagonal bins.

In general, in another aspect, the invention features a method of configuring sources and receivers for collecting sample data. The method may include: aligning receivers in a parallel series of linear arrays, the receivers being spaced at approximately the same interval along each linear array; aligning sources in a parallel series of paired linear arrays perpendicular to the receiver arrays, the sources in one member array of each pair being staggered with respect to the sources of the other member array of the same pair; and defining a nonorthogonal coordinate grid with gridpoints representing the midpoint between each source and receiver based on the positions of each source and receiver.

Other features and advantages of the invention will be apparent from the following description, including the drawings, and from the claims.

DETAILED DESCRIPTION

The invention provides a method and apparatus for acquiring and processing 3D seismic data, for example, data from a 3D seismic survey, using a hexagonal sampling grid. The method and apparatus group seismic traces into hexagonal bins defined by a hexagonal grid instead of into rectangular bins defined by a rectangular grid. The method and apparatus may be described for square and regular hexagonal grids, but are applicable to rectangles and hexagons of any shape. Use of hexagonal bins instead of rectangular bins improves both efficiency and symmetry. Hexagonal grids require 13.4% to 25% fewer grid points than rectangular grids for sampling circularly bandlimited, two-dimensional signals. Hexagonal grids also offer 50% more symmetry than rectangular grids, leading to more accurate digital operators and calculations.

The cost of a 3D survey is defined by the bin size and, consequently, the receiver and source individual station interval. Because hexagonal binning requires fewer gridpoints than rectangular (square) binning, for practical applications, the source or receiver interval may be increased, which may help reduce the survey cost.

Figure 2:
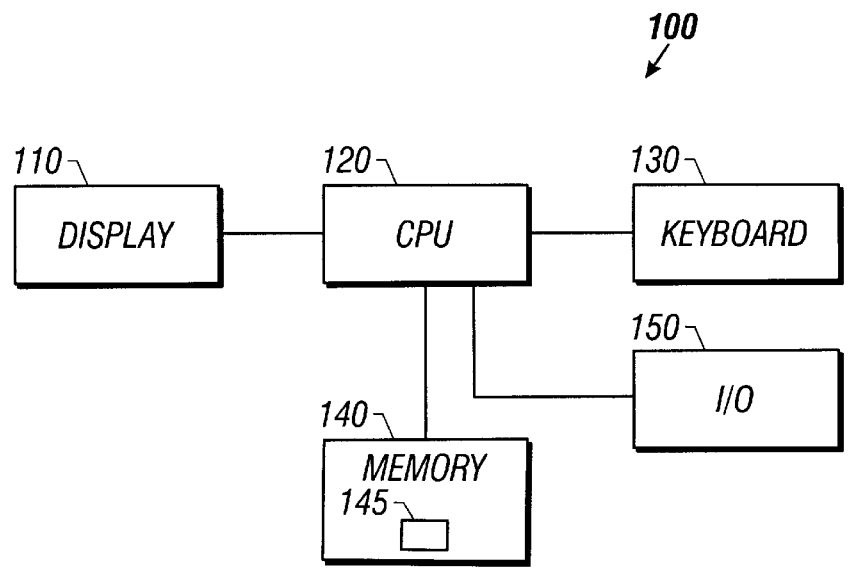
FIG. 2 shows a computer system in accordance with an embodiment of the invention.

Before discussing the method further, reference is made to FIG. 2 which shows a computer system 100 configured in accordance with an embodiment of the invention. Computer system 100 comprises a central processor (CPU) 120 coupled to a display 110, a keyboard 130, a memory 140, and input/output (I/O) devices 150. Display 110 may be a computer monitor or equivalent device for displaying information associated with input or output information (e.g., seismic information) to a user. Keyboard 130 may be a computer keyboard for the user to input information to the computer system 100. Memory 140 stores instructions 145 which are used to instruct the CPU 120 to carry out processes in accordance with embodiments of the invention including, for example, instructions related to the steps shown in FIG. 5 below. Memory 140 comprises a computer-readable memory medium which may be volatile or nonvolatile memory, or a combination of both, for example, a hard disk, a floppy disk, a CD-ROM, magnetic storage, optical storage, RAM including DRAM, flash memory, registers, or any other appropriate storage medium. I/O devices 150 represent a communication device or a combination of communication devices (e.g., a modem, ISDN adapter, telephone lines, wireless services) or other information propagating or telecommunications devices or media, used for reception or transmission of sample data or processed data. The I/O devices 150 may also be used for receiving or transmitting instructions in accordance with an embodiment of the invention to be stored or retrieved from the memory 140.

RECTANGULAR VERSUS HEXAGONAL GRIDS

Figure 1A:
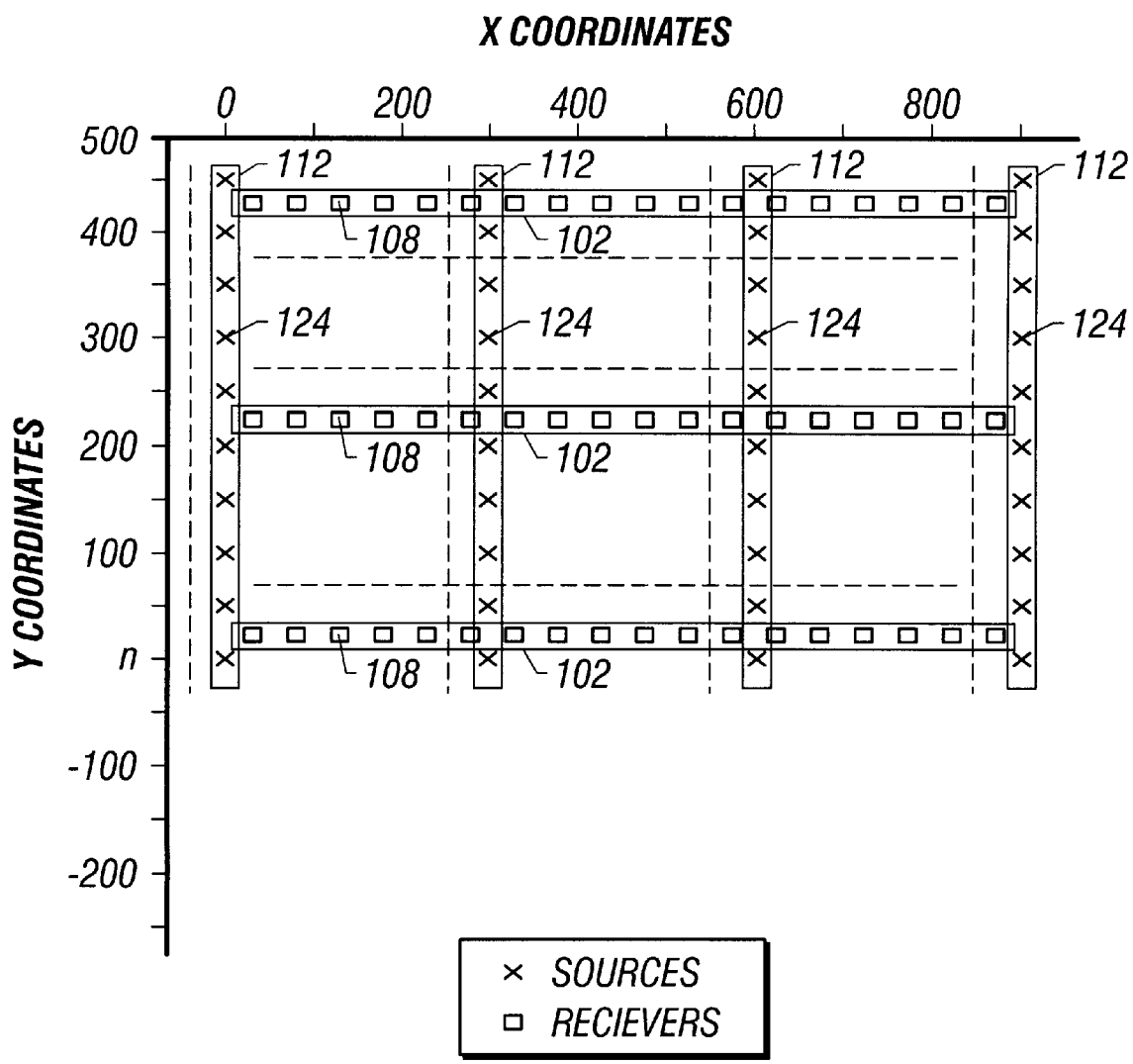
FIG. 1A shows a known three dimensional acquisition geometry for land, transition zone, and ocean bottom cable surveys with source lines perpendicular to receiver lines.
Figure 1B:
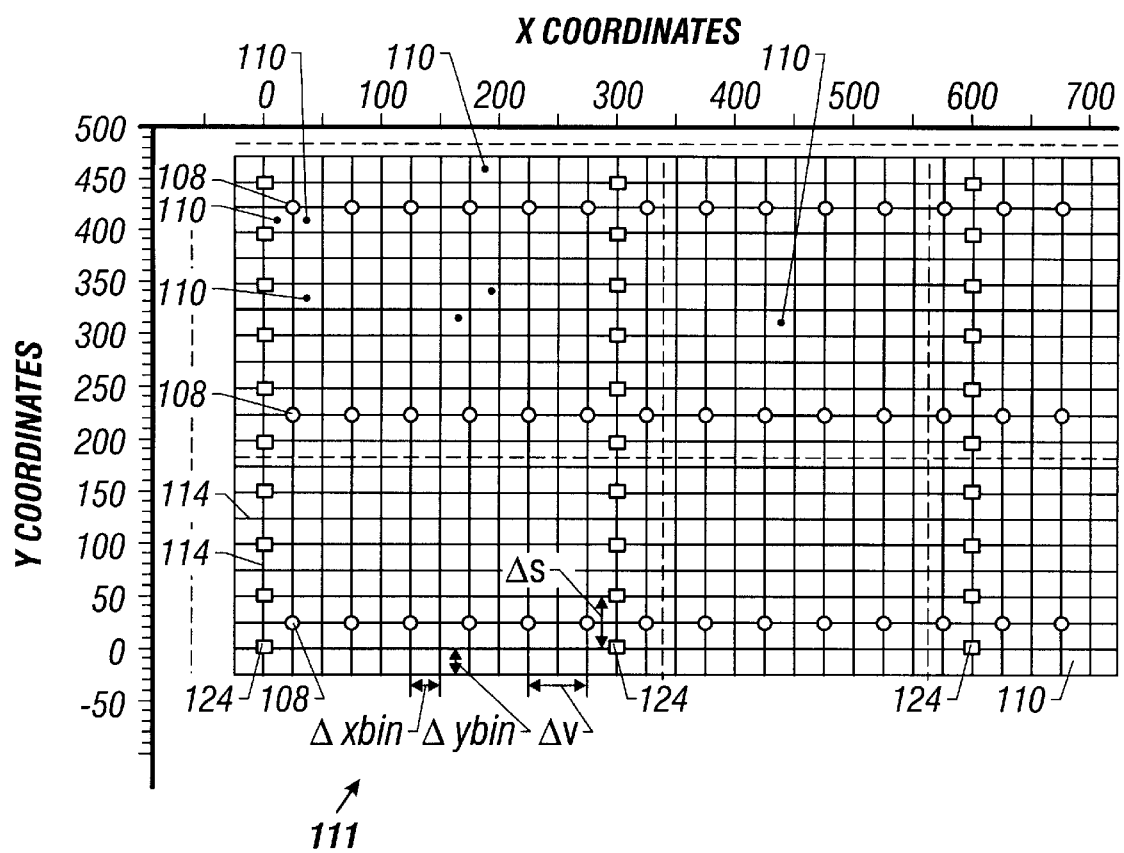
FIG. 1B shows a regular grid superimposed on the regular geometric configuration of sources and receivers in FIG. 1A.
Figure 3A:
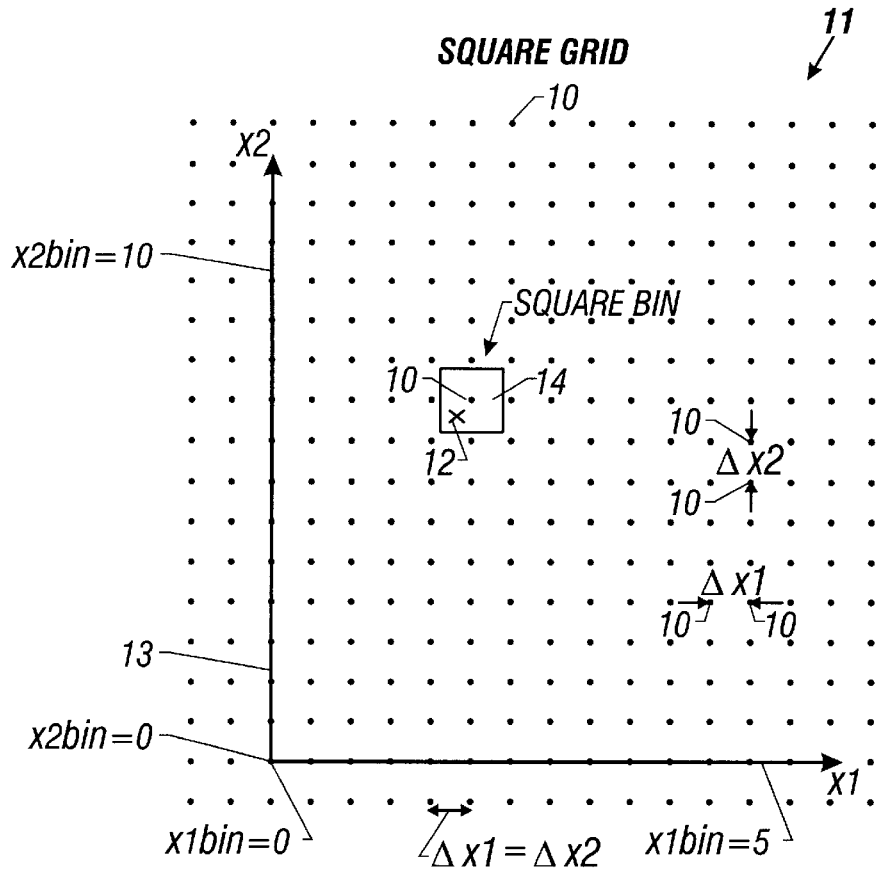
FIGS. 3A and 3B show known square and regular hexagonal grids.
Figure 3B:
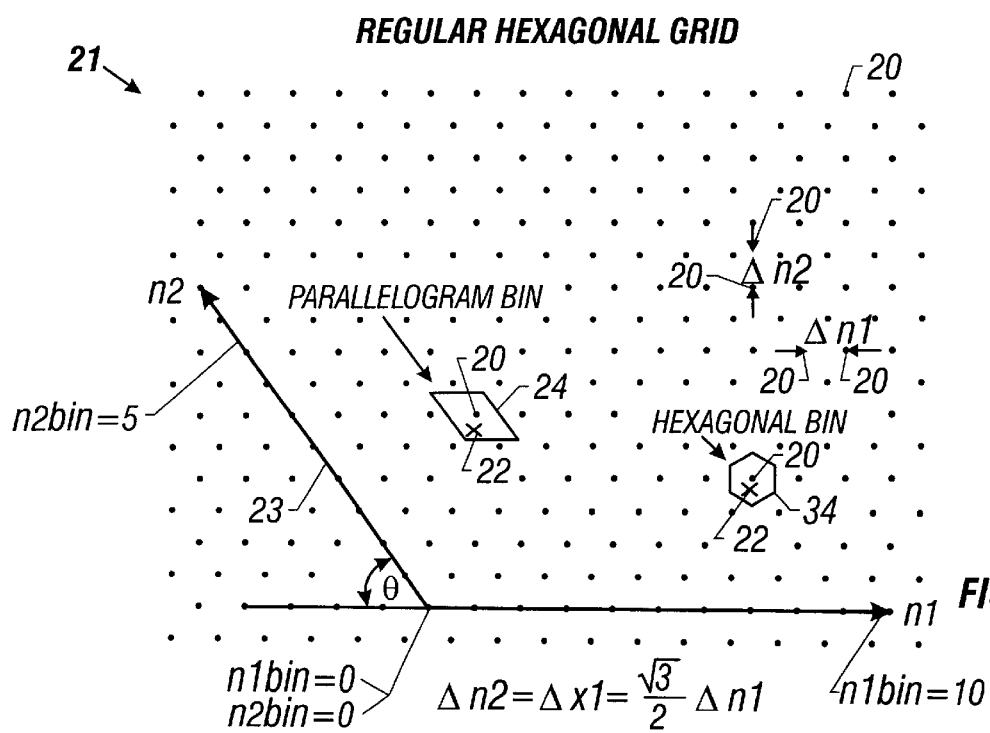

FIGS. 3A and 3B show a square grid 11 superimposed on an orthogonal coordinate system 13 (x1,x2) and a regular hexagonal grid 21 superimposed on a nonorthogonal coordinate system 23 (n1,n2), respectively. In FIG. 3A, the horizontal and vertical gridpoint 10 (here these are bin center gridpoints which form grid 110 in FIG. 1A) spacings are labeled as $\Delta x1_{bin}$ and $\Delta x2_{bin}$, respectively, with the square bin 14 (similar to bins 114 in FIG. 1A) size equal to the product $\Delta x1_{bin} * \Delta x2_{bin}$. In FIG. 3B, the horizontal and vertical gridpoint 20 (here these are bin center gridpoints which form grid 21) spacings are labeled as $\Delta n1_{bin}$ and $\Delta n2_{bin}$, respectively, with a hexagonal bin 34 size equal to $\Delta n1_{bin} * \Delta n2_{bin}$. Bin locations may be specified on the two grids by counting bins along their axes to form integer pairs, for example, $(x1_{bin}, x2_{bin})$ and $(n1_{bin}, n2_{bin})$, respectively. For example, in FIGS. 3A and 3B, the square grid shows a square bin at (5,10) and the hexagonal grid shows a hexagonal bin at (10,5).

For the rectangular grid in FIG. 3A, data samples 12 (i.e., source/receiver midpoints located at particular x1,x2 space coordinates relative to the x1, x2 axes) may be "binned" (assigned) to polygonal bins 14. The binning is done using two comparisons or divisions:

$$x1_{bin} = \text{INTEGER}\left(\frac{x1 + \frac{\Delta x1_{bin}}{2} \cdot \frac{|x1|}{x1}}{\Delta x1_{bin}}\right), \quad (1)$$

and $$x2_{bin} = \text{INTEGER}\left(\frac{x2 + \frac{\Delta x2_{bin}}{2} \cdot \frac{|x2|}{x2}}{\Delta x2_{bin}}\right). \quad (2)$$

In Eqs. 1 and 2, "Integer()" is an operation which rounds the floating point argument down to an integer value. This operation is necessary because bin numbers and subsequent bin arithmetic are integer. In Eqs. 1 and 2, $\Delta x1_{bin}$ and $\Delta x2_{bin}$ are the bin 14 spacings along x1 and x2, respectively. It may be expected that there is a cost savings in performing the comparisons expressed in Eqs. 1 and 2 rather than using an alternative approach of searching for the nearest midpoint to the data.

Figure 4:
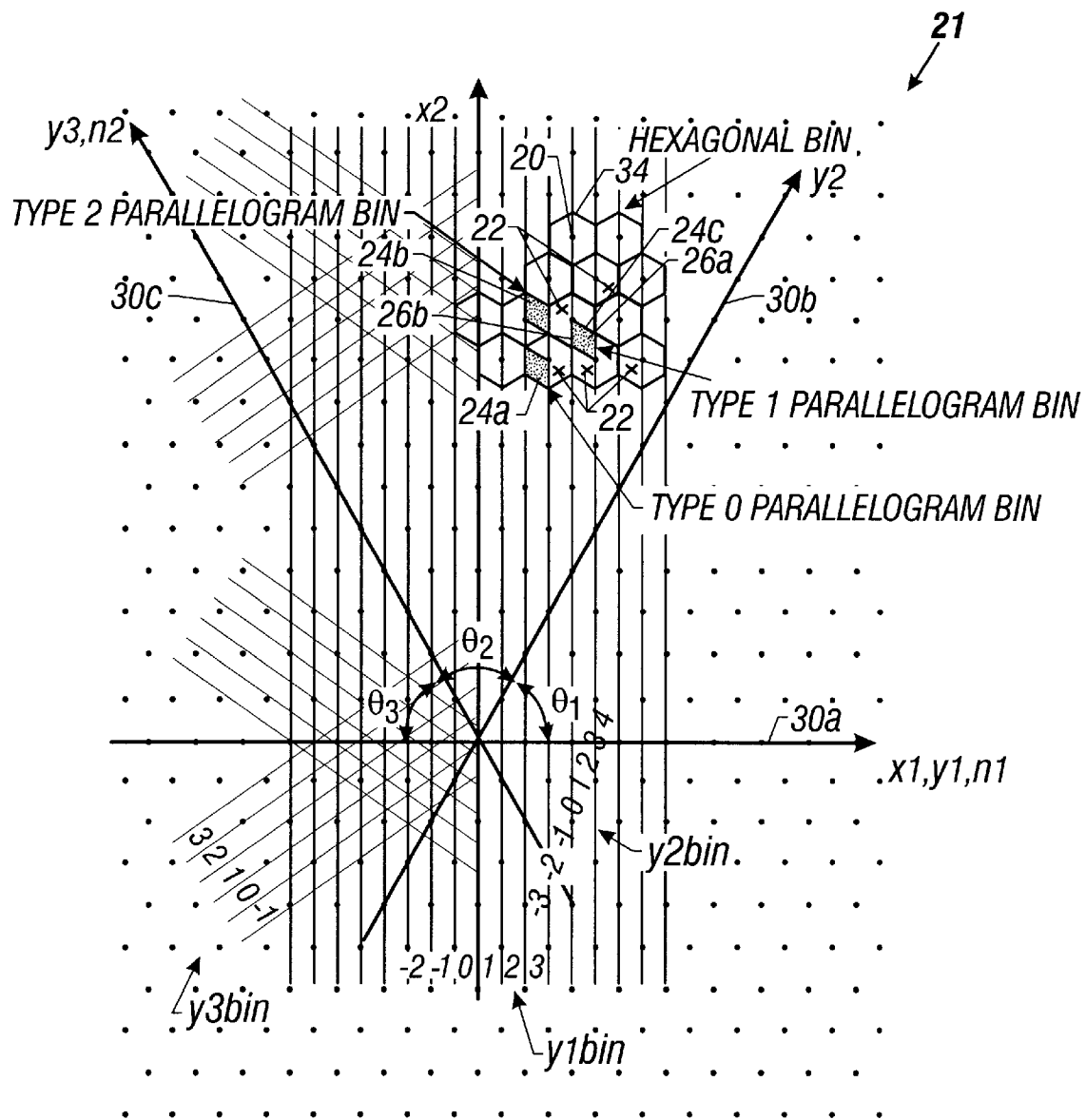
FIG. 4 shows axes (y1, y2, y3) of a coordinate system required for unique specification of hexagonal bins in accordance with an embodiment of the invention.

Data can be binned into parallelogram bins on a hexagonal grid with two similar comparisons or divisions, but for hexagonal bins the algorithm is more complicated. Because the bins have three pairs of parallel edges, three axes are required for three comparisons. FIG. 4 shows the axes (y1,y2,y3) required for uniquely assigning random midpoints to hexagonal bins.

In the method, it is assumed that the data 22 has been translated and rotated onto the (x1,x2) coordinate system as pictured in FIG. 4. Under control of instructions 145 from the memory 140, the CPU 120 bins data 22 first into parallelogram bins 24 (24a, 24b, 24c) on the hexagonal grid 21 with two comparisons or divisions similar to what was discussed above. Samples 22 are assigned to parallelogram bins 24 defined by y1 and y2 coordinates, and then these parallelogram bins are associated with hexagonal bins 34 as will be described below in reference to FIG. 5.

Three types of parallelogram bins 24 are distinguishable in FIG. 4: parallelogram bins 24a (type 0) which lie in the bottom left of the hexagonal bins 34; parallelogram bins 24b (type 2) which lie in the top right of the hexagonal bins 34; and parallelogram bins 24c (type 1) which are split between two diagonally adjacent hexagonal bins 34. The first two types of parallelogram bins 24 (24a, 24b) require only the y1 and y2 axes for association with hexagonal bins 34. The third type (24c) requires all three y1, y2, and y3 axes.

Figure 5:
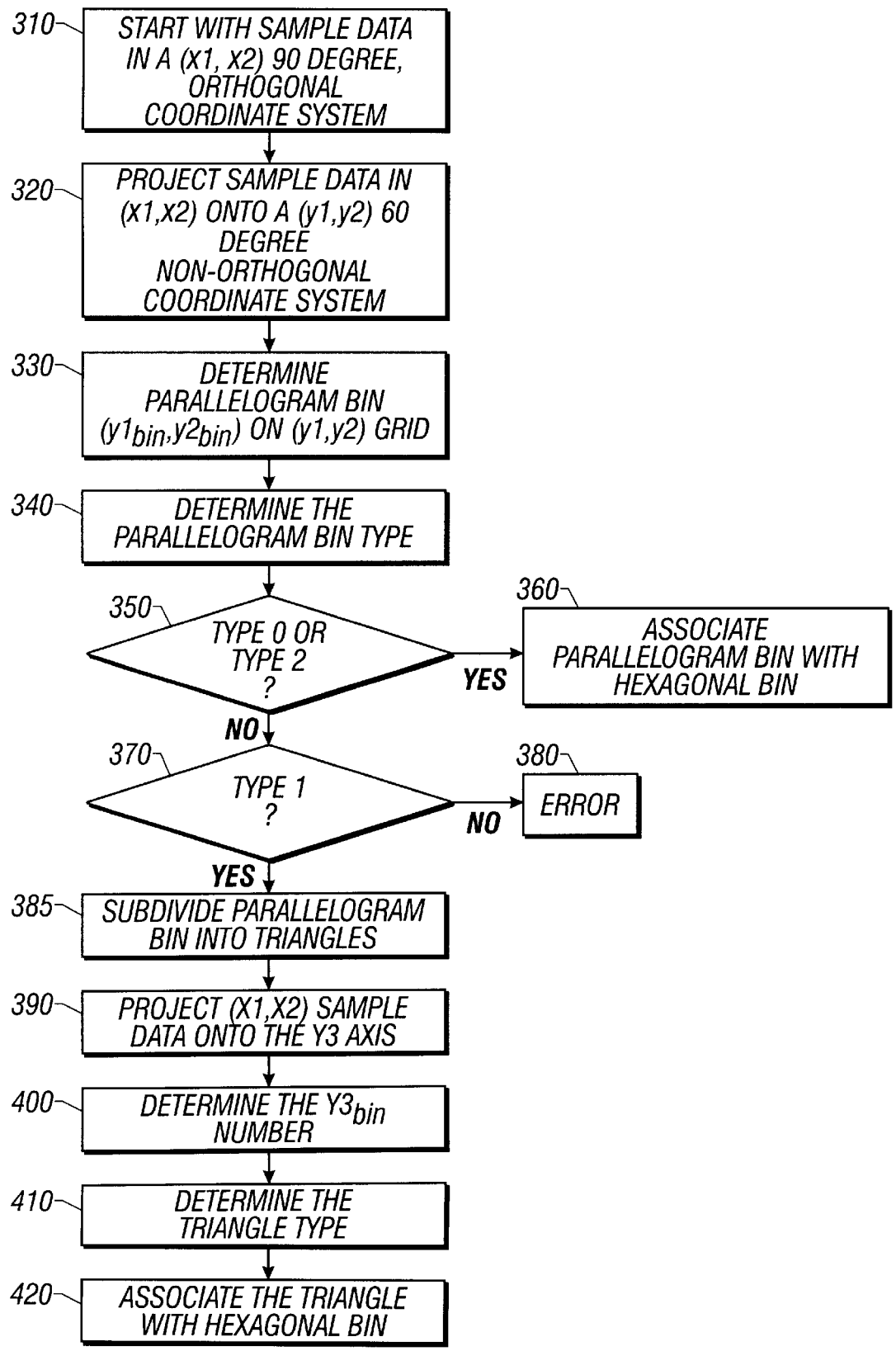
FIG. 5 shows a flowchart in accordance with an embodiment of the invention.

Referring to FIGS. 4 and 5, in a method in accordance with an embodiment of the invention, instructions 145 control the CPU 120 to start with data 22 in the x1,x2 orthogonal coordinate system. The midpoint sample 22 is mapped (e.g., projected) 320 onto the y1 and y2 nonorthogonal coordinate system axes, e.g., for $\theta=\theta_1=\theta_2=\theta_3=60°$. The projection is done by setting, for example, y1=x1, y2=x1 cos $\theta$+x2 sin ($\theta$) where $\theta=\theta_1=60°$=the angle between the y1 and y2 axes (FIG. 3). The sample 22 is then assigned 330 to one of the parallelogram bins 24a, 24b, or 24c using (i.e., the correct parallelogram bin 24a, 24b, or 24c is determined from):

$$y1_{bin} = \text{Integer}\left(\frac{y1}{\Delta y1_{bin}} + \frac{\left(1+\frac{|y1|}{y1}\right)}{2}\right), \tag{3}$$

and $$y2_{bin} = \text{Integer}\left(\frac{y2}{\Delta y2_{bin}} + \frac{\left(1+\frac{|y2|}{y2}\right)}{2}\right). \tag{4}$$

In Eqs. 3 and 4, $y1_{bin}$ and $y2_{bin}$ are the bin labels or identifiers, y1 and y2 are the coordinates of the sample 22 in the y1,y2 axes system, $\Delta y1_{bin}$ and $\Delta y2_{bin}$ are the sizes of the parallelogram bins along the y1 and y2 axes directions, and $\Delta y1_{bin}=\Delta y2_{bin}=0.5\Delta n1_{bin}$, with $\Delta n1_{bin}$ being the size of the particular hexagonal bin 34 along the y1(n1) axis. The hexagonal bins 34 are divided in half because this enables the hexagonal bins 34 to be divided into the parallelogram bins 24a, 24b, and 24c. As illustrated in FIG. 4, numerical labeling of the parallelogram bins 24 along the y1, y2, and y3 axes starts from 1 and increases in the positive direction along each axis. Labeling also starts from 0 and decreases in the negative direction. This labeling is arbitrary and the parallelogram bins are not centered on the coordinate gridpoints 20 and not necessarily on the sample points 22. For a fixed $Y1_{bin}$, the parallelogram bins 24 cycle through the three types for increasing $y2_{bin}$. For example, the cycle progresses from type 0 parallelogram bin 24a to type 1 bin 24b, and then to type 2 bin 24c, and so on. Determining the parallelogram type (0, 1, or 2) requires finding where the ($y1_{bin},y2_{bin}$) parallelogram falls in this cycle. This may be done by referencing (see Eq. 7 below) the parallelogram bin 24, for example, to a known type 0 parallelogram bin (24a). If the parallelogram bin 24 is type 0 (24a) 350, then for a given $y1_{bin}$ row:

$$y2_{bin} = \frac{y1_{bin} + 3(|y1_{bin}| \% \ 2)}{2} \tag{5}$$

where % is the remainder operator for integer arithmetic:

$$a \ \% \ b = a - b \cdot \frac{a}{b}. \tag{6}$$

Consequently, the parallelogram bin 24 type is given by $$type=\{3+[(y2_{bin},y2_0)\% \ 3]\}\% \ 3, \tag{7}$$

where $y2_0$ is the $y2_{bin}$ of Eq. 5.

The parallelograms bins are then assigned 360 to particular hexagonal bins 34. For type 0 parallelogram bins 24a, the corresponding hexagonal bin 34 is defined by:

$$n1_{bin} = \frac{y1_{bin} + (|y1_{bin}| \% \ 2)}{2} + \frac{(y2_{bin} - y2_0)}{3} \tag{8}$$

and $$n2_{bin} = |y1_{bin}| \% \ 2 + 2\left(\frac{y2_{bin} - y2_0}{3}\right). \tag{9}$$

The hexagonal bins 34 are numbered 0 along the n1 and n2 axes, i.e., $n1_{bin}=0$ for hexagons with centers on the n1 axis and $n2_{bin}=0$ for hexagons with centers on the n2 axis.

On the other hand, if the parallelogram bin 24 is 350 a type 2 parallelogram bin 24b, then the corresponding hexagonal bin 34 is defined by $$n1_{bin} = \frac{y1_{bin} + (|y1_{bin}| \% \ 2)}{2} + \frac{y2_{bin} - y2_0 - 2}{3} \tag{10}$$

and $$n2_{bin} = |y1_{bin}| \% \ 2 + 2\left(\frac{y2_{bin} - y2_0 - 2}{3}\right) + 1. \tag{11}$$

If, however, the ($y1_{bin},y2_{bin}$) parallelogram bin 24 is 370 a type 1 parallelogram bin 24c, the parallelogram bin 24 must be subdivided 385 into triangles (26a, 26b), to determine the corresponding hexagonal bin 34 as discussed below. Otherwise, if the type of parallelogram bin is not indicated to be 0, 1, or 2, an error occurs 380. Assuming there is no error and the type is type 1, the original x1,x2) coordinates of the sample data 22 are first projected 390 onto the third axis, y3, using:

$$y3=x2 \sin \theta-x1 \cos (\theta), \tag{12}$$

where, for example, $\theta=\theta_1=60°$ for a regular hexagonal grid, although the method is applicable to non-regular hexagonal grids and bins. Then, the sample data 22 are binned 400 (i.e., the $y3_{bin}$ number is determined) using:

$$y3_{bin} = \frac{y3}{\Delta y3_{bin}} + \frac{\left(1 + \frac{|y3|}{y3}\right)}{2}, \tag{13}$$

where $\Delta y3_{bin}=0.5\Delta n1_{bin}$. $\Delta y3_{bin}$ is the spacing of the parallelogram bin along the y3 axis.

For subdividing into triangles within the parallelogram bins 24 (type 1), there are two types of triangles that may be defined: triangles 26a of triangle type 0 which lie in the upper left corner of the hexagonal bin 34, and triangles 26b of triangle type 1 which lie in the lower right corner. As before for parallelogram type, identifying the triangle type requires referencing 410 $y3_{bin}$ to a known triangle type. For each $y1_{bin}$ row, the triangle is of type 0 (triangle 26a) if:

$$y3_{bin} = \frac{3(|y1_{bin}| \% 2) - y1_{bin}}{2} + 1, \tag{14}$$

and the triangle type is:

$$type = \{3 + [(y3_{bin} - y3_0) \% 3]\} \% 3, \tag{15}$$

where $y3_0$ is the $y3_{bin}$ of Eq. 14. For both triangle types 0 and 1, the hexagonal bin 34 number or identifier $n1_{bin}$ for the bin center gridpoint is:

$$n1_{bin} = \frac{y1_{bin} + |y1_{bin}|\%2}{2} + \frac{(y3_{bin} - y3_0 - 1)}{3}. \tag{16}$$

For type 0 triangles, the hexagonal bin 34 number $n2_{bin}$ for the bin center gridpoint is:

$$n2_{bin} = |y1_{bin}| \% 2 + 2\left(\frac{y3_{bin} - y3_0 - 1}{3}\right); \tag{17}$$

for type 1 triangles, it is:

$$n2_{bin} = |y1_{bin}| \% 2 + 2\left(\frac{y3_{bin} - y3_0 - 1}{3}\right) + 1. \tag{18}$$

Therefore, once the triangle of the parallelogram 24c is determined to be either type 0 (26a) or 1 (26b), the triangle is associated or identified 420 with the correct hexagonal bin 34. The result is that the sample data 22 is binned in the correct hexagonal bin 34 for use in further seismic analysis of the stacked common midpoint gathers (data 22). In accordance with other embodiments of the invention, the above process is completely applicable to bin sample data 22 to nonregular hexagonal bins defined for axes at angles other than $\theta=\theta_1=\theta_2=\theta_3=60°$.

Regular hexagonal sampling and square (rectangular) sampling with comparable spatial Nyquist frequencies (see FIGS. 3A and 3B) differ in bin size and bin center locations. The receiver station interval (i.e., the distance between receivers) determines the rectangular bin size in the in-line receiver direction, and the source station interval defines the bin size in the cross-line direction. For the square grid (e.g., bin 14 of FIG. 3A) the bin size is $\Delta x1_{bin}$ in the $\Delta 1$ axis direction and $\Delta x2_{bin}$ in the x2 axis direction, and $\Delta x1_{bin}=\Delta x2_{bin}$. For the regular hexagonal grid (e.g., bin 34 of FIGS. 3B and 4) however, the bin size is $\Delta n1_{bin}$ in the y1 (n1) axis direction and $\Delta n2_{bin}$ in the vertical direction between gridpoints (i.e., in the direction perpendicular to the y1 (n1) axis), $\Delta n2_{bin}=\Delta x1_{bin}$, and $\Delta n1_{bin}=(2/\sqrt{3})\Delta n2_{bin}$ (for $\theta=60°$). Thus, for the regular hexagonal grid, the distance between bin midpoints in one direction may approximately equal the square grid midpoint interval (e.g., $\Delta x1_{bin}$) but in the other direction, the distance between bin midpoints may be approximately 1.15 ($2/\sqrt{3}\approx1.15$) times larger. Because the gridpoint interval in one direction for a hexagonal bin is larger versus a rectangular bin, the number of gridpoints may be reduced. Larger bins around these fewer gridpoints relate directly to the cost of the survey because the source interval or the receiver interval can be increased, and, consequently, the number of receivers or the number of sources can be decreased.

Bin center locations for a square grid are vertically and horizontally aligned in regular rows and columns (see FIG. 3A). Bin center locations in adjacent rows and columns for a hexagonal grid, however, are offset vertically and horizontally because alternate rows and columns are identical, but odd-numbered rows and columns are shifted horizontally by one-half sample interval with respect to even-numbered rows and columns, respectively (see FIG. 3B).

Figure 6:
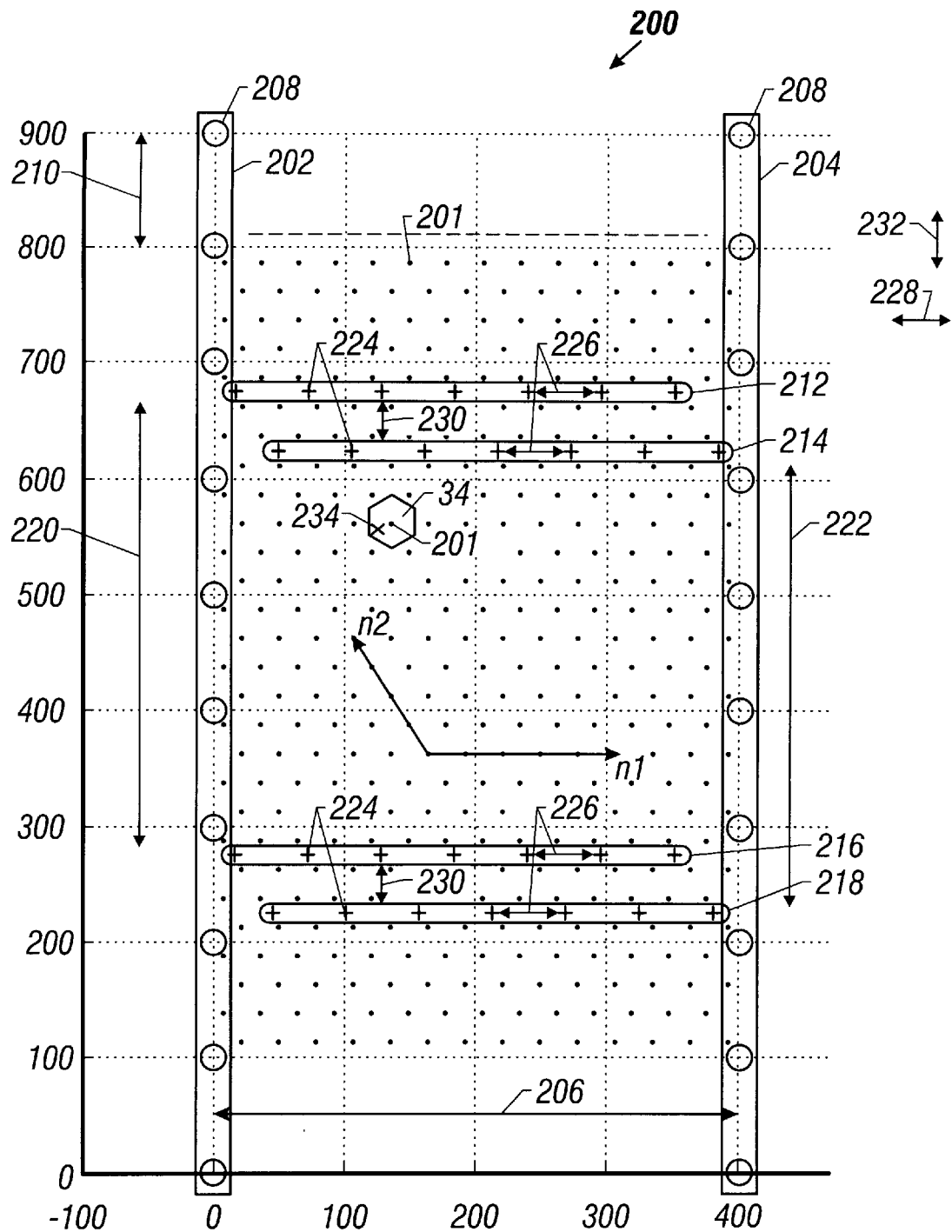
FIG. 6 shows a three dimensional acquisition geometry for a hexagonal grid configuration for land, transition zone, and ocean bottom cable surveys in accordance with an embodiment of the invention.

Referring to FIG. 6, in accordance with an embodiment of the invention, a 3D acquisition configuration for acquiring data for a hexagonal grid 200 similar to that described above (i.e., similar to grid 21 of FIGS. 3B and 4) may be generated in the following way: Two receiver lines 202 and 204 are laid out with a cross-line separation 206 of, for example, approximately 404.04 meters ("m"). The receiver station (receiver) 208 interval 210 is, for example, approximately 100 m. Source lines 212, 214, 216, and 218 are laid out perpendicular to the receiver lines 202 and 204 with intervals 220 and 222 between lines 212 and 216 and lines 214 and 218, respectively. Intervals 220 and 222 are, for example, approximately 400 m (a multiple of receiver station 208 interval 210). Source stations (sources) 224 are separated by a source station 224 interval 226 of, for example, approximately 57.72 m in the in-line direction 228 and staggered by a source station 224 stagger interval 230 of, for example, approximately 50 m. The staggering is in the in-line 228 (x) and source station 224 cross-line 232 (y) directions in order to cover the whole survey area. The gridpoints 201 (similar to bin center gridpoints 20 of FIGS. 3B and 4) are shown as well in FIG. 6 which are the ideal common midpoint locations. However, for real data 234 (e.g., sample data 22) the common midpoints will not always fall on the gridpoints 201. Rather, some may be offset, and yet binning of the samples 234 (similar to samples 22 of FIGS. 3B and 4) will still be possible to bins 34, as discussed above (FIG. 6 only shows one of the hexagonal bins 34 for simplicity of the drawings although more could have been indicated as in FIG. 4). This configuration of the receivers 208 and sources 224 will generate the hexagonal bin 34 sizes of 25 m ($\Delta n1_{bin}$) in the receiver 208 in-line direction (same as the direction 232) and 28.86 m ($\Delta n2_{bin}$) in the receiver 208 cross-line direction (same as the direction 228). This embodiment of the invention may be applied generically, i.e., the hexagonal binning can be applied for the binning of seismic data acquired on land, in the transition zone, and in marine environments. Moreover, in accordance with embodiments of the invention, other acquisition configurations of source lines and receiver lines could be used to generate a hexagonal grid like hexagonal grid 200.

In accordance with an alternative embodiment of the invention, the positions in FIG. 6 of the receivers 208 and sources 224 may be reversed. This leads to what is termed "reciprocity". In this case, reciprocity means that the grid point 201 locations will be the same as for the grid 200, and, therefore, binning of sample data 234 will be quite similar to what was described above. It may be desirable to lay out sources 224 and receivers 208 in the reciprocal arrangement due to environmental, economic, or other considerations or factors.

Other embodiments are within the scope of the following claims.

What is claimed is:

1. A method of associating seismic data with polygonal bins to aid in processing the seismic data, the method comprising:

mapping sample data onto a nonorthogonal coordinate grid on which different types of polygonal bins are constructed, determining into which type of polygonal bin the sample data are allotted, and associating the allotted polygonal bin with a corresponding one of the other bins.

2. The method of claim 1, wherein the associating comprises binning the sample data in the corresponding one of the other bins.

3. The method of claim 1, wherein the determining comprises determining if the allotted polygonal bin is one of a first, a second, and a third type.

4. The method of claim 3, further comprising, if the allotted polygonal bin is of the third type, mapping the sample data onto an axis of the nonorthogonal coordinate grid, determining a bin number of the allotted polygonal bin associated with the axis, referencing the bin number to a known triangle type, and associating the triangle type with one of the different types of polygonal bins.

5. The method of claim 4, wherein the mapping comprises projecting the sample data onto the axis.

6. The method of claim 1, wherein the mapping comprises mapping onto a grid on which different types of parallelogram bins are constructed, wherein the determining comprises determining into which type of parallelogram bin the sample data are allotted, and wherein the associating comprises associating the allotted parallelogram bin with the corresponding one of the other bins.

7. The method of claim 1, wherein the mapping comprises projecting the sample data onto the nonorthogonal coordinate grid.

8. The method of claim 1, wherein the sample data are common midpoint data.

9. The method of claim 1, wherein the nonorthogonal coordinate grid comprises a hexagonal grid.

10. The method of claim 1, wherein the mapping comprises mapping common midpoint data.

11. An apparatus for binning sample data comprising:

a memory storing logic used for binning the sample data, and a processor which operates under control of the logic to:
map the sample data onto a nonorthogonal coordinate grid on which may be constructed different types of parallelogram bins and hexagonal bins,
determine into which type of parallelogram bin the sample data are allotted, and
associate the allotted parallelogram bin with a corresponding one of the hexagonal bins.

12. The apparatus of claim 11, wherein the sample data are seismic data.

13. The apparatus of claim 11, wherein the hexagonal bins are centered on gridpoints of the nonorthogonal coordinate grid.

14. The apparatus of claim 11, wherein the hexagonal bins are formed of regular hexagons.

15. The apparatus of claim 11, wherein the sample data are common midpoint data.

16. The apparatus of claim 11, wherein the processor is instructed to bin the sample data into hexagonal bins.

17. The apparatus of claim 11, further comprising I/O devices which communicate the sample data.

18. A method of configuring sources and receivers for collecting sample data, the method comprising:

aligning receivers in a parallel series of linear arrays, the receivers being spaced at approximately the same interval along each linear array, aligning sources in a parallel series of paired linear arrays perpendicular to the receiver arrays, the sources in one member array of each pair being staggered with respect to the sources of the other member array of the same pair, and defining a nonorthogonal coordinate grid with gridpoints representing the midpoint between each source and receiver based on the positions of each source and receiver.

19. The method of claim 18, wherein the defining comprises defining a hexagonal grid.

20. The method of claim 18, further comprising defining hexagonal bins based on the nonorthogonal coordinate grid.

21. The method of claim 20, further comprising sending signals from the sources to the receivers which are processed by binning in the hexagonal bins.

22. The method of claim 18, further comprising forming a reciprocal configuration of sources and receivers which defines the same nonorthogonal coordinate grid.

* * * * *